3,108,112
METHOD FOR THE PRODUCTION OF 2-METHYL-5-CYANO-6-PYRIDONE-4-CARBOXYLATE

Masanao Matsui, Tokyo, Akio Kobayashi, Yokohama, and Suzuo Watanabe, Tokyo, Japan, assignors to Meiji Seika Kaisha, Ltd., Tokyo, Japan, a corporation of Japan
No Drawing. Filed Sept. 2, 1960, Ser. No. 53,616
Claims priority, application Japan Sept. 16, 1959
1 Claim. (Cl. 260—294.9)

The present invention relates to a method for the production of 2 - methyl - 5 - cyano - 6 - pyridone - 4 - carboxylate which is a main intermediate product in a synthesis of vitamine $B_6$ 2-methyl-3-hydroxy-4,5-bis-(hydroxymethyl)-pyridine.

The object of the present invention is to obtain ethyl-2-methyl-5-cyano-6-pyridone-4-carboxylate with high yield by new method, the condensation of cyanoacetamide with ethyl acetoacrylate easily obtainable in industrial scale.

According to the present invention a method is provided that 2 - methyl - 5 - cyano - 6 - pyridone - 4 - carboxylate (following Formula III) is produced with high yield by condensing alcohol solution of acetoacrylate (following Formula I) and cyanoacetamide (following Formula II) in the presence of organic base.

It has been proposed to synthesize pyridone derivatives by condensation of α-β-unsaturated carbonyl compound and cyanoacetamide. This synthesis is carried out in two stages of condensation reaction and dehydrogenation reaction.

The process for the production of 2-methyl-5-cyano-6-pyridone-4-carboxylate according to the present invention is entirely novel one in that the process is carried out in one stage.

As shown in the following Table 1 the best result may be obtained in the case of the mol ratio between cyanoacetamide and acetoacrylate being 1:2 or more. The reason can be understood from the dehydrogenation reaction of surplus acetoacrylate.

The reaction proceeds very slowly at room temperature so that in general the reaction would be carried out under boiling and reflux for 4-5 hours in alcohol solution. As the catalyst for condensation reaction there may be mentioned organic bases, alkali metal alcoholate and the like. The best yield can be obtained from the employment of piperidine as catalyser.

In this reaction, 2-methyl-1-2-dehydro-4-alcoxycarbonyl-5-cyanopiperidone-6 which will be expected to be formed by Michael type condensation may not be obtained but only dehydrogenated substance, that is to say, said pyridone derivative 2-methyl-5-cyano-6-pyridone-4-carboxylate deposits as crystal which is considered to be resulted from the dehydrogenation reaction of surplus acetoacrylic acid in a form of hydrogen-acceptor.

The raw material acetoacrylate (I) may readily be obtained from levulinic acid.

The reaction in the present invention may be represented by the following equation.

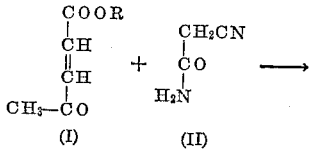

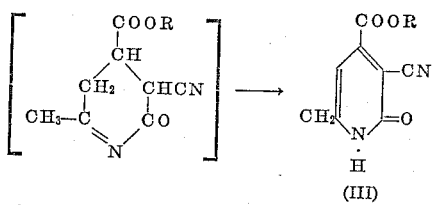

The present invention will be illustrated by way of the following examples.

EXAMPLE 1

3.1 g. of cyanoacetamide is dissolved in 40 cc. of 95% ethanol by heating. To this transparent solution, 10 g. of ethyl acetoacrylate and 1 cc. of piperidine are added and refluxed on a boiling water bath for 5 hours. On leaving the mixture in the cold place overnight yellow scale-like crystals deposit. Washing of the crystals with ethanol gives 1.8 g. of ethyl 2-methyl-5-cyano-6-pyridone-4-carboxylate which corresponds to 26% of theoretical amount calculated on cyanoacetamide. M.P. 210° C. (not corrected). By repeated recrystallization from ethanol melting point may be raised to 214° C.

Analysis (as $C_{10}H_{10}N_2O_3$):

|  | C (percent) | H (percent) | N (percent) |
|---|---|---|---|
| Calculated | 58.25 | 4.89 | 13.58 |
| Found | 58.42 | 4.55 | 13.39 |

The mixed melting point determination with a standard specimen showed no depression.

EXAMPLE 2

To the solution of 12.8 g. of methyl acetoacrylate and 4.2 g. of cyanoacetamide in 50 cc. of hot methanol 1 cc. of piperidine is added. The mixture is subjected to heat treatment under reflux on a water bath for 11 hours. Leaving the mixture in an ice box overnight, the precipitate formed is recrystallized from methanol. There are obtained 2.8 g. of white needles methyl 2-methyl-5-cyano-6-pyridone-4-carboxylate methyl ester. Yield 24% calculated on cyanoacetamide. M.P. 228°–230° C. (not corrected).

Analysis:

|  | C (percent) | H (percent) | N (percent) |
|---|---|---|---|
| Calculated | 56.25 | 4.20 | 14.58 |
| Found | 56.95 | 3.80 | 14.35 |

Table 1

|  | Mol ratio | | |
|---|---|---|---|
| Ethyl acetoacrylate (mol) | 1 | 2 | 3 |
| Cyanoacetamide (mol) | 1 | 1 | 1 |
| Yield (percent) | 10 | 26 | 26 |

What we claim is:

The process for the production of 2-methyl-5-cyano-6-pyridone-4-carboxylate which comprises: condensing in alcoholic solution acetoacrylate and cyanoacetamide in a mol ratio of about 1 mol cyanoacetamide to at least 2 mols acetoacrylate in the presence of a compound selected from the group consisting of piperidine and alkali metal alcoholate.

References Cited in the file of this patent

UNITED STATES PATENTS 2,422,616    Harris ---------------- June 17, 1947

FOREIGN PATENTS 713,469    Germany -------------- Nov. 7, 1941

OTHER REFERENCES

Royals: "Advanced Organic Chemistry," pages 790–98 (1954), Prentice-Hall.